United States Patent
Thier et al.

[19]

[11] Patent Number: 5,862,654
[45] Date of Patent: Jan. 26, 1999

[54] ENGINE MOUNTING FOR BELT DRIVEN MACHINE

[75] Inventors: Richard David Thier, Juneau; James Edward Muse, Columbus, both of Wis.

[73] Assignee: Deere & Company, Moline, Ill.

[21] Appl. No.: 882,679

[22] Filed: Jun. 25, 1997

[51] Int. Cl.[6] .................................................. H01D 34/53
[52] U.S. Cl. .................. 56/249; 56/DIG. 3; 56/DIG. 10; 56/12.6; 180/299
[58] Field of Search .................................. 56/249, 294, 7, 56/253, 251, DIG. 3, DIG. 10, 12.6, 16.9; 180/299, 300, 68.4; 267/140.13, 153

[56] References Cited

U.S. PATENT DOCUMENTS

| | | | |
|---|---|---|---|
| 3,003,300 | 10/1961 | Jepson | 56/249 |
| 3,176,454 | 4/1965 | Jepson et al. | 56/249 |
| 3,181,289 | 5/1965 | Patt | 56/249 |
| 3,841,425 | 10/1974 | Harkness | 180/299 |
| 3,901,003 | 8/1975 | Erdman | 56/12.6 |
| 3,951,223 | 4/1976 | Kamlukin | 180/68.4 |
| 4,481,757 | 11/1984 | Tsuichiya | 56/16.9 |
| 4,858,880 | 8/1989 | Durand | 267/153 |
| 5,129,479 | 7/1992 | Fujii et al. | 267/153 X |

Primary Examiner—Heather Shackelford

[57] ABSTRACT

An engine mounting structure is provided for use with a turf care machine such as a greens mower. Single cylinder engines, such as are used on greens mowers and similar turf care cutting machines, generate significant vibration. Greens mowers and which are used for finish cutting lose cut quality and precision with excessive vibration. To reduce vibration, an improved mounting structure includes resilient mounts to support the rear portion of the engine on the machine frame. To avoid belt misalignment between the engine drive pulley and the driven pulley powering the cutting reel, which can occur when resiliently mounting an engine, the forward portion of the engine is rigidly secured to the machine frame.

8 Claims, 4 Drawing Sheets

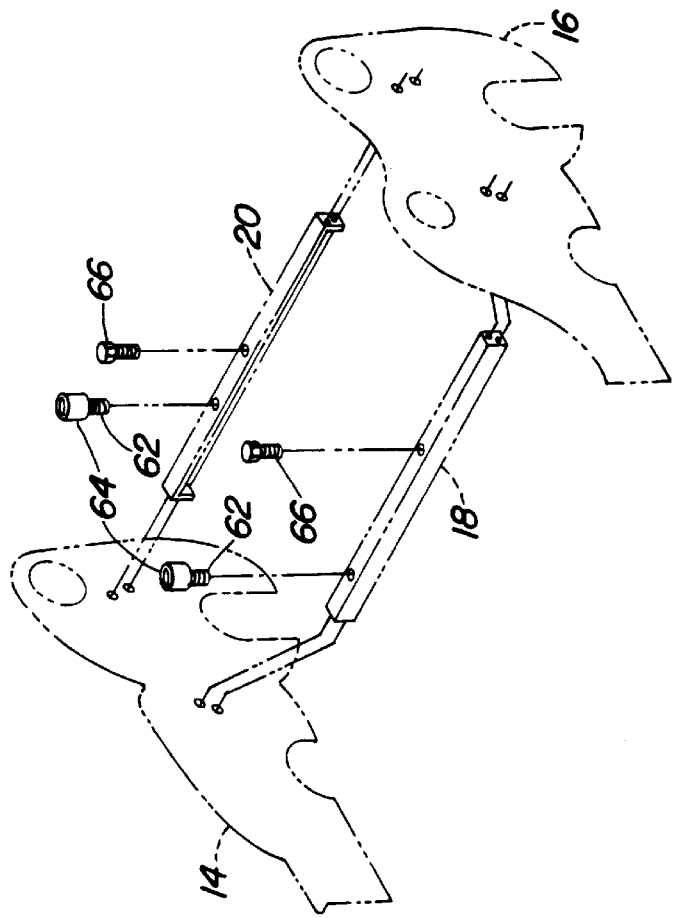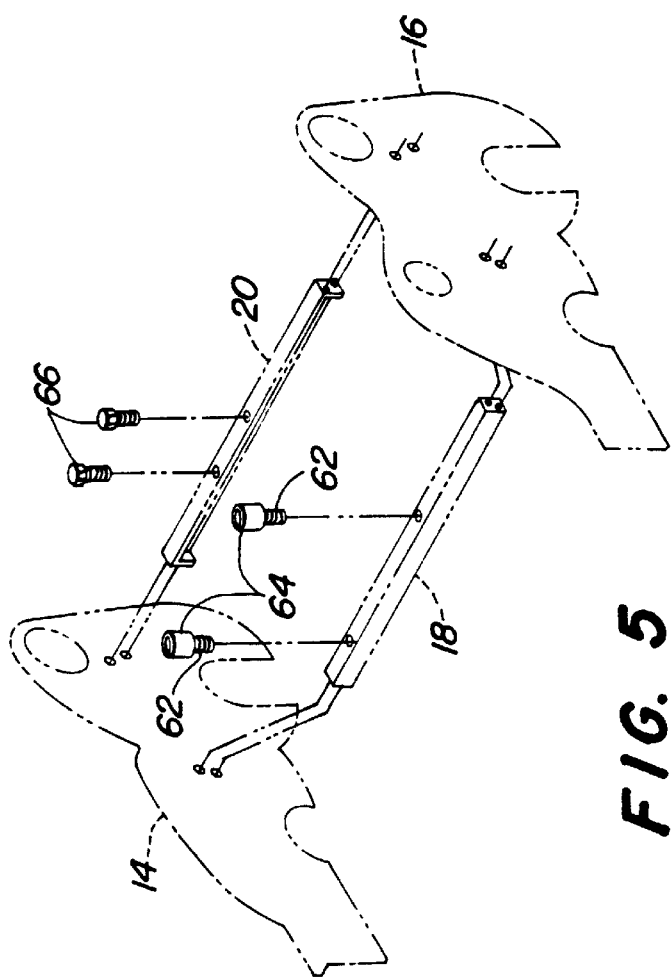

ENGINE MOUNTING FOR BELT DRIVEN MACHINE

FIELD OF THE INVENTION

The present invention relates to walk-behind turf care machines, and more specifically, to the engine mounting structure for a walk-behind greens mower.

BACKGROUND OF THE INVENTION

Many walk-behind turf care machines, such as reel mowers used for mowing golf greens, utilize single cylinder horizontal shaft engines. These engines, which commonly operate with significant vibration, are rigidly mounted to the frame of the mower. In applications such as greens mowing, where the grass may be cut only a few thousandth of an inch at a time, vibrations transmitted to the cutting reel can result in an unacceptable quality of cut. Further, such vibrations can cause operator discomfort and/or fatigue as well as result in reduced machine reliability.

To reduce the transfer of engine vibration to the frames of machines, it is known to use resilient engine mounting blocks between the engine and frame. However, many walk-behind turf care machines utilize belts to transfer power from the engine to the reel or other turf engaging element. When an engine adapted for transmitting power through belt drives is mounted on all resilient mountings, the engine can twist as high loads are applied to the belt drive. That can result in a misalignment between the drive and the driven pulleys, which can eventually lead to premature drive belt failure.

It would therefore be desirable to provide a means for mounting a single cylinder engine on a walk-behind turf care machine which could reduce vibration transferred to the frame of the machine as well as to the operator. It would further be desirable to provide an improved engine mounting means for use on such a machine having a belt driven power transfer system. It would also be desirable to reduce the vibration encountered by belt powered walk behind greens mowers to improve its greens cutting performance, where the cutting accuracy is so important.

SUMMARY OF THE INVENTION

Accordingly, there is provided a mounting for a walk-behind greens mower with a single cylinder engine which reduces the vibration transferred from that engine to the frame of the machine. There is further provided an engine mounting which provides for stable transfer of power from the engine and through a belt driven power system in a reel mower. More specifically, there is provided an engine mounting wherein one end or side of the engine is rigidly bolted to the frame to minimize engine twist and belt misalignment problems while the other end or side of the engine is mounted on resilient mounts to reduce vibration transmitted to the machine and cutting element.

BRIEF DESCRIPTION OF THE DRAWINGS

FIG. 5 is a schematic plan view of the cross members and mounting means with the resilient mounting means used on the forwardly cross member and the rigid mounting means used on the rearwardly cross member.

FIG. 6 is a schematic plan view of the cross members and mounting means with the resilient mounting means used on one side of the forwardly and rearwardly cross members and the rigid mounting means used on the other side of the forwardly and rearwardly cross members.

DESCRIPTION OF THE PREFERRED EMBODIMENT

Figure 1:
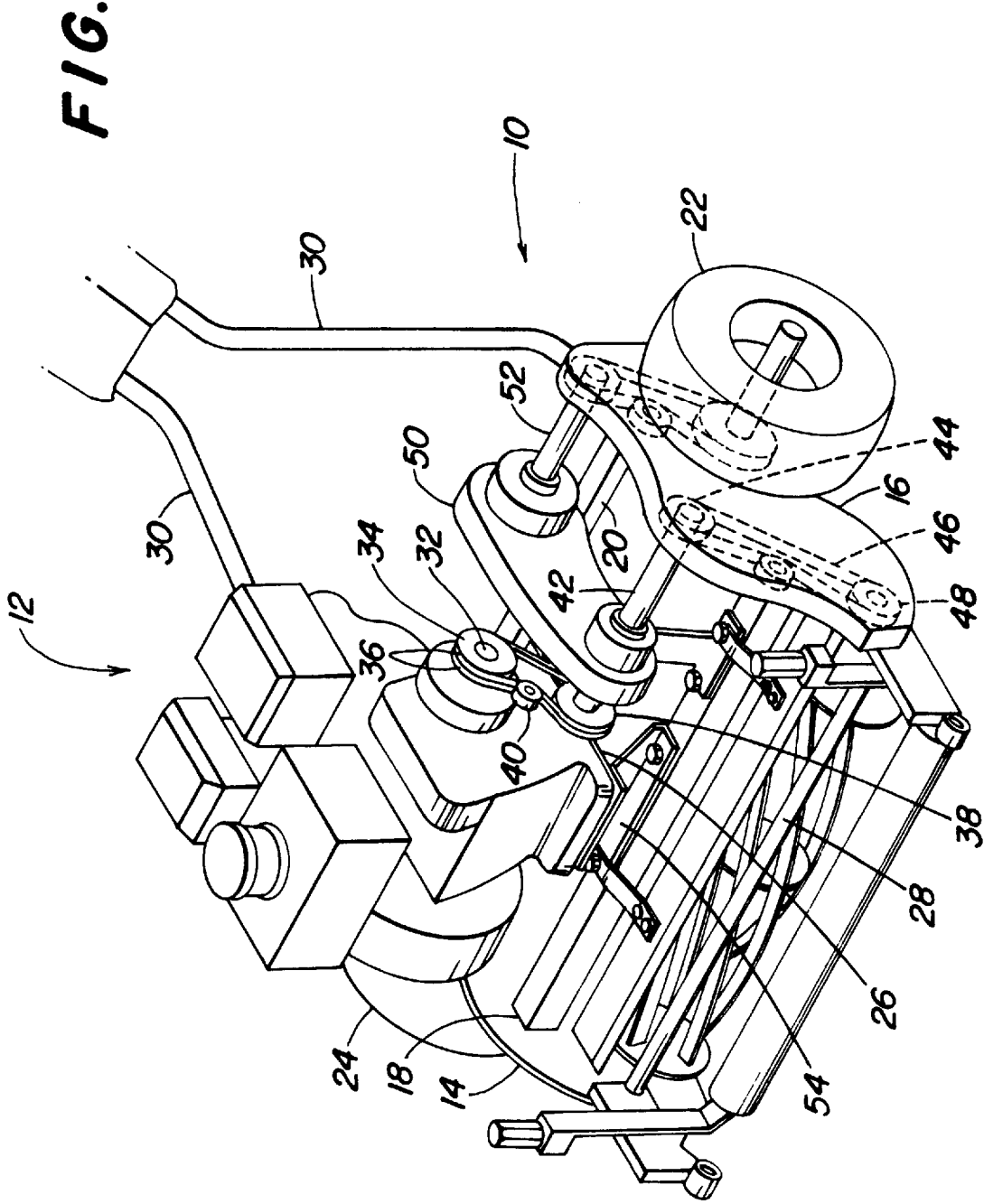
FIG. 1 is an elevated front perspective view of a walk-behind greens mower of the type which would utilize the present invention.

Looking first to FIG. 1, there is illustrated a walk-behind greens mower 10 with an engine 12 supported on a framework which includes left and right side members 14 and 16 and laterally extending forwardly and rearwardly cross members 18 and 20. Left and right powered drive wheels 22 and 24 support the framework. The mower 10 is powered by the engine 12 which is mounted on a base plate 26 that is in turn secured to the cross members 18 and 20. At the forward end of the mower 10 is carried the turf cutting element, which is in the preferred embodiment a reel 28. Extending upwardly from the framework is a pair of handles 30 which would be equipped with the appropriate conventional mower controls.

The engine 12 is preferably gas powered and has a single cylinder with its drive shaft 32 oriented horizontally. The drive shaft 32 carries a drive pulley 34, which in the preferred embodiment, is comprised of dual sheaves. A pair of endless drive belts 36 are entrained over the pulley 32 and power a driven pulley 38 which also has dual driven sheaves. A tensioning pulley 40 is mounted between the drive and driven pulleys 34 and 38. A driven shaft 42 supports the driven pulley 38 and transmits rotational power to a sprocket 44 supported by the right side member 16. An endless chain 46 transmits power to a reel sprocket 48 to drive the cutting reel 28.

A power transmission case 50 encloses a conventional chain and gear drive, unshown, for transmitting power from the driven shaft 42, to a wheel drive shaft 52 and the drive wheel 22 coupled with it.

Figure 2:
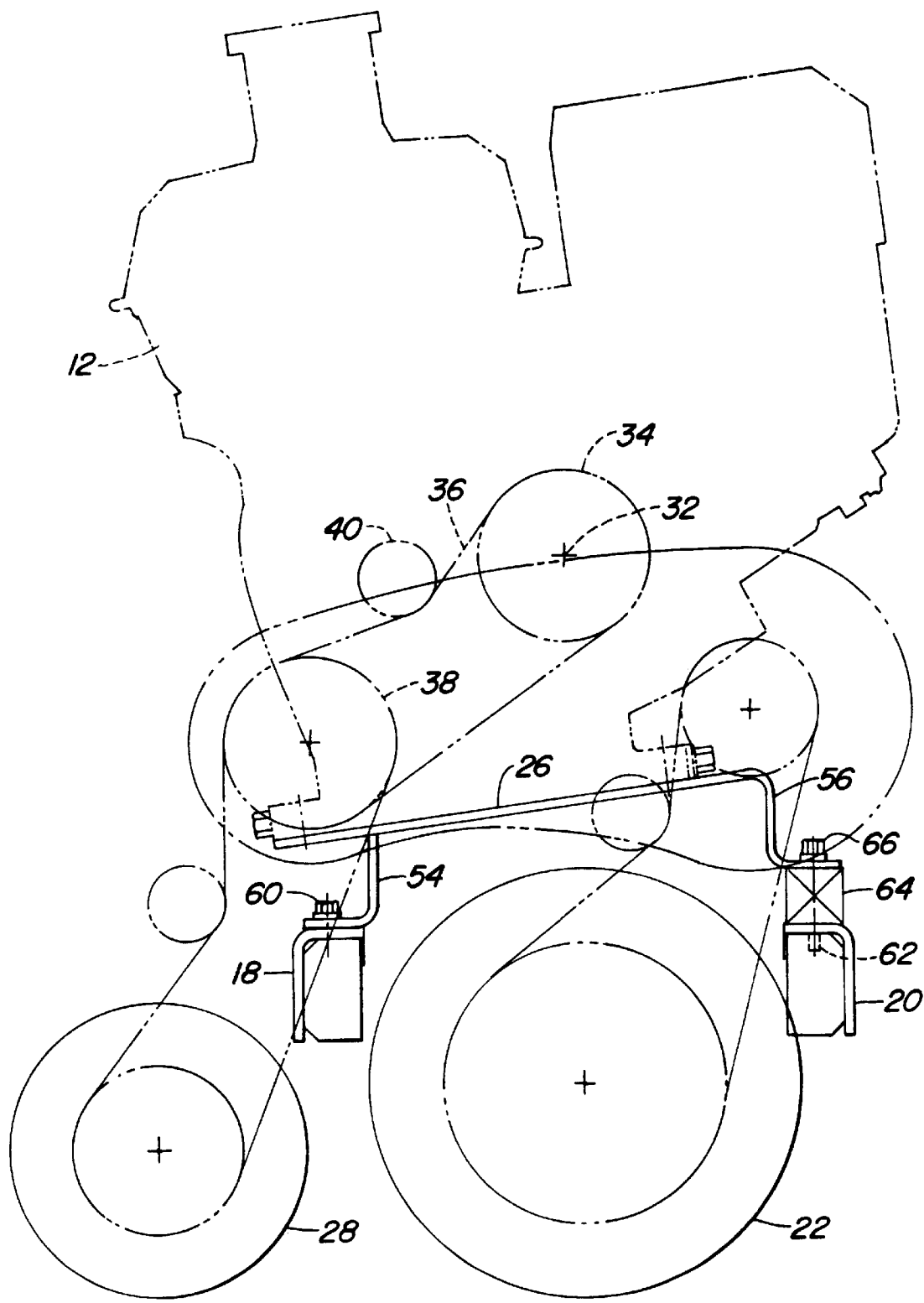
FIG. 2 is an exploded perspective view of selected reel chassis components including the mounting structure for the engine
Figure 3:
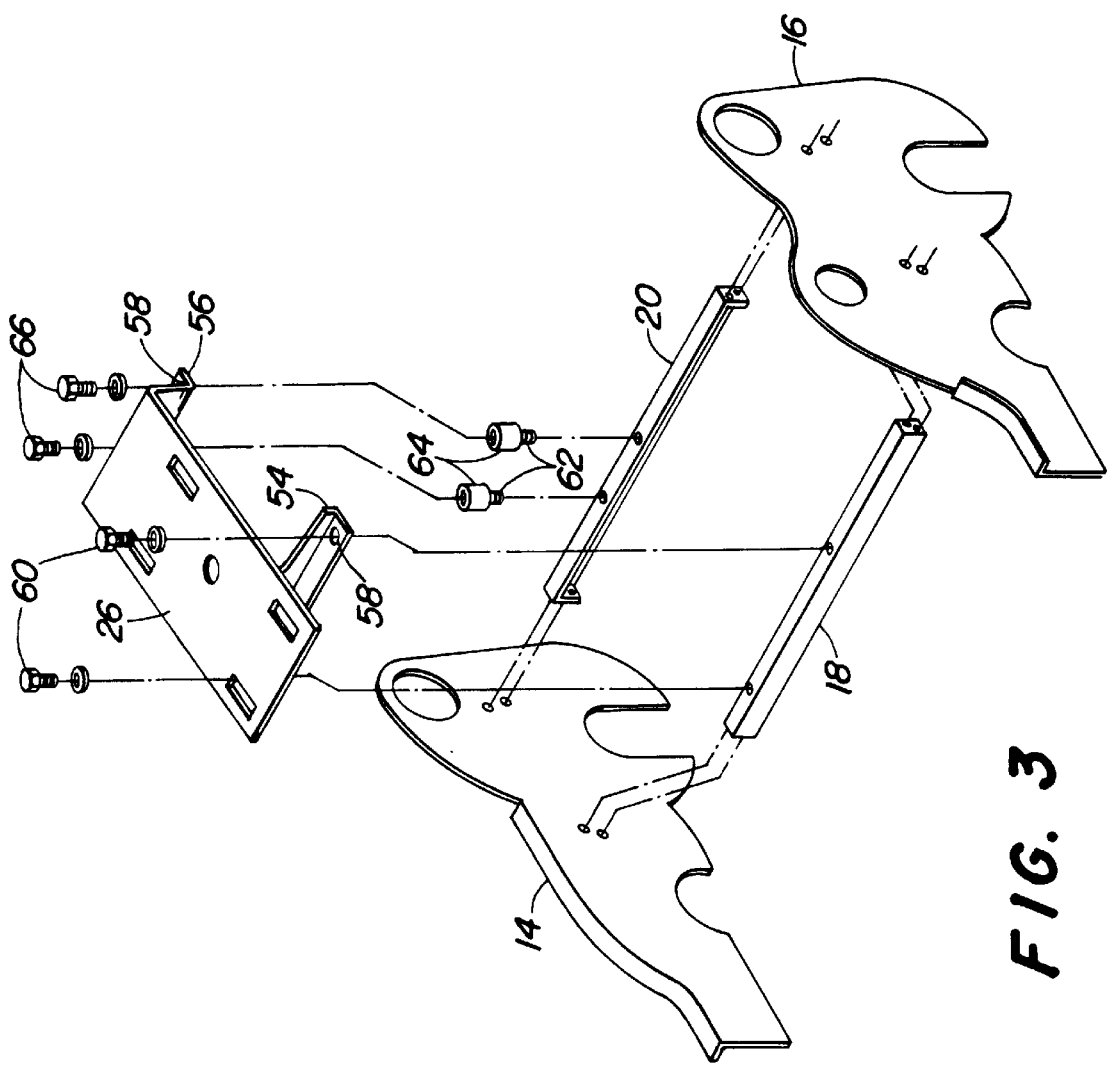
FIG. 3 is a schematic side view of the engine and its support structure.

Looking now to FIGS. 2 and 3, there is shown in more detail the mounting structure for the engine 12. The engine 12 is secured to the sheet metal base plate 26 by conventional means. The base plate 26, in turn, utilizes forwardly and rearwardly cross braces 54 and 56 to couple it with the cross members 18 and 20. The forwardly brace 54 is welded or by similar conventional means attached to the forward portion of the base plate 26 while the rearwardly brace 56 is preferably formed into the rear of the sheet metal base plate 26. Through each brace 54 and 56 are provided openings 58 that receive mounting bolts 60 to secure the plate 26 to the cross members 18 and 20.

Figure 4:
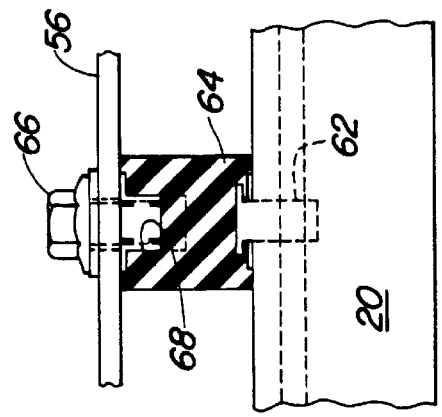
FIG. 4 is an enlarged view through the center of the resilient mounting structure.

As seen in FIG. 2, the base plate 26 is inclined downwardly at its forward end and is rigidly secured with the mounting bolts 60 to the forwardly cross member 18. Threads are provided in the cross member 18 to receive the bolts 60. As is best shown in FIG. 4, similar threads are provided in the rear cross member 20 to receive the threaded studs 62 which are embedded in and projecting from the resilient mounting members 64 sandwiched between the rear cross member 20 and the base plate 26. Mounting bolts 66 are also used to secure the rear cross brace 20 and cross brace 56 of base plate 26 to threaded members 68 carried in the resilient mounting members 64.

In use, an operator would walk behind the mower 10 and control its operation through levers supported by the handles 30. The gas powered engine 12 would rotate the drive shaft 32 and the drive pulley 34 connected to it. The belts 36 carried between the drive and driven pulleys 34 and 38 would transmit power to the cutting reel 28 and drive wheels 22. Since the engine 12 is preferably a single cylinder engine, a considerable amount of vibration would occur.

The combination of rigid and resilient mounting connections between the engine 12 and framework, however, would serve respectively to prevent the engine 12 from twisting on the mower frame and reduce vibrations transmitted to the cutting reel 28. Since the front of the base plate 26 and engine 12 are rigidly coupled to the mower framework, the engine 12 and base plate 26 would not be able to twist. Accordingly, the drive pulley 34 would maintain alignment with the driven pulley 38 and belt performance and life would be enhanced. Since the rear of the engine 12 is resiliently supported on the rearwardly cross member 20, the vibrations attendant with the single cylinder gas engine 12 would be attenuated, with less being transferred into the frame. Accordingly, the mower reel would be vibrated less thereby providing a cutting level which would be more consistent. Further, the fewer vibrations would reach the operator control levers, thereby reducing the discomfort experienced as the operator as well as slowing the onset of operator fatigue.

While the preferred embodiment provides for the front of the engine 12 to be rigidly mounted to the forwardly cross member 18 and the rear of it to be resiliently mounted to the rearwardly cross member 20, the engine 12 could be rigidly mounted to the rearwardly cross member 20 and resiliently mounted to the forwardly cross member 18, see FIG. 5. Alternatively, and as illustrated in FIG. 6, one side of the engine 12 could be rigidly mounted to one side of both cross members 18 and 20 with the other side of the engine 12 being resiliently mounted to the other side of both cross members 18 and 20.

With the present invention there is provided an engine mounting structure for a walk-behind turf care machine that permits the use of a single cylinder engine, yet assures reliable belt driven power to the cutting element and reduced vibrations transferred to the machine frame. As a result, the precision of the machine cutting element, such as greens cutting reels is improved. With the reduction in vibration being transferred to the frame work of the mower, the height of cut of the reels as utilized in applications where precision in cutting is important, such as golf greens, is better maintained resulting in a more precise cut and better overall appearance to the golf green. Operator discomfort and/or fatigue caused by machine vibration is additionally minimized.

We claim:

1. A walk-behind greens mower having a frame including generally laterally extending forwardly and rearwardly cross members;

an engine having a laterally projecting drive shaft;

a cutting reel having a generally laterally extending driven shaft;

an endless belt drive means coupling the drive and driven shafts;

means for rigidly mounting the engine to one of the forwardly and rearwardly cross members; and resilient means mounting the engine to the other of the forwardly and rearwardly cross members.

2. The invention defined in claim 1 wherein the resilient means mounts the engine to the rearwardly cross member and the means for rigidly mounting the engine secures the engine to the forwardly cross member.

3. The invention defined in claim 2 wherein the resilient means for mounting the engine includes rubber mounts positioned between the engine and the rearward cross member.

4. The invention defined in claim 1 wherein the means rigidly mounting the engine rigidly connects the engine to one side of the forwardly and rearwardly rearward cross members and the resilient means mounting the engine connects the engine to the other side of the forwardly and rearwardly rearward cross members.

5. The invention defined in claim 1 wherein the means for rigidly mounting the engine includes a plurality of spaced-apart bolts securing the engine with the cross member.

6. The invention defined in claim 1 wherein the engine is secured to a mounting base which is secured on the cross members.

7. The invention defined in claim 1 wherein the engine is a gasoline powered engine.

8. A walk-behind greens mower having a frame including generally laterally extending forward and rearward cross members;

a single cylinder engine having a generally laterally projecting drive shaft;

a cutting reel having a generally laterally extending driven shaft;

a v-belt coupling the drive and driven shafts;

means for rigidly mounting the engine to the forward cross member; and resilient means mounting the engine to the rearward cross member.

* * * * *